US008161058B2

(12) United States Patent
Agarwal et al.

(10) Patent No.: US 8,161,058 B2
(45) Date of Patent: Apr. 17, 2012

(54) PERFORMANCE DEGRADATION ROOT CAUSE PREDICTION IN A DISTRIBUTED COMPUTING SYSTEM

(75) Inventors: Manoj K. Agarwal, Noida (IN); Gautam Kar, Yorktown Heights, NY (US); Anindya Neogi, New Delhi (IN); Anca Sailer, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 12/056,530

(22) Filed: Mar. 27, 2008

(65) Prior Publication Data

US 2008/0177698 A1 Jul. 24, 2008

Related U.S. Application Data

(63) Continuation of application No. 11/435,411, filed on May 17, 2006, now Pat. No. 7,412,448.

(51) Int. Cl.
*G06F 7/00* (2006.01)
(52) U.S. Cl. ...................................................... 707/758
(58) Field of Classification Search ........... 707/999.002, 707/758
See application file for complete search history.

(56) References Cited

U.S. PATENT DOCUMENTS 7,409,316 B1* 8/2008 Saghier et al. ................. 702/182
2003/0065986 A1* 4/2003 Fraenkel et al. ................ 714/47
2005/0251371 A1* 11/2005 Chagoly et al. ................. 703/1

OTHER PUBLICATIONS

J. Aman et al., "Adaptive Algorithms for Managing a Distributed Data Processing Workload," IBM Systems Journal, vol. 36. No. 2, pp. 242-283, 1997.
M. Goldszmidt et al., "On the Quantification of e-Business Capacity," (EC 2001), Florida, USA, pp. 235-244, Oct. 14-17, 2001.
Y. Diao et al., "Stochastic Modeling of Lotus Notes with a Queueing Model," Computer Measurement Group International Conference (CMG 2001), California, USA, 9 pages, Dec. 2001.
Z. Liu et al., "On Maximizing Service-Level-Agreement Profits," ACM Conference on Electronic Commerce (EC 2001), Florida, USA, 11 pages, Oct. 2001.
Daniel A. Menascé, "Two-Level Iterative Queuing Modeling of Software Contention," 10th IEEE International Symposium on Modeling, Analysis and Simulation of Computer and Telecommunications Systems (MASCOTS 2002), Texas, USA, 10 pages, Oct. 2002.
W.S. Cleveland et al., "IP Packet Generation: Statistical Models for TCP Start Times Based on Connection Rate Superposition," ACM SIGMETRICS 2002, pp. 1-12, 2002.

(Continued)

*Primary Examiner* — Jensen Hu
(74) *Attorney, Agent, or Firm* — Anne V. Dougherty; Ryan, Mason & Lewis, LLP (57) ABSTRACT

A method of identifying at least one resource in a distributed computing system which is a potential root cause of performance degradation of the system includes the steps of: computing operational bounds for the system and operational bounds for at least one resource in the system; comparing current end-to-end system performance with the operational bounds for the system; when the current end-to-end system performance is outside of the operational bounds for the system, comparing current performance of the at least one resource in the system with the operational bounds for the at least one resource; and generating at least one output identifying the at least one resource in the system which is a potential root cause of performance degradation of the system.

12 Claims, 4 Drawing Sheets

OTHER PUBLICATIONS

H. Wang et al., "Detecting SYN Flooding Attacks," IEEE INFOCOM 2002, 10 pages, 2002.

W.E. Leland et al., "On the Self-Similar Nature of Ethernet Traffic (Extended Version)," IEEE/ACM Transactions on Networking, vol. 2, pp. 1-15, Feb. 1994.

M. Thottan et al., "Anomaly Detection in IP Networks," IEEE Transactions on Signal Processing. vol. 51, No. 8, pp. 2191-2204, Aug. 2003.

C. Hood et al., "Proactive Network Fault Detection," IEEE INFOCOM, Japan, 9 pages, Apr. 1997.

M. Gupta et al., "Discovering Dynamic Dependencies in Enterprise Environments for Problem Determination," Proceedings of 14th IFIP/IEEE International Workshop on Distributed Systems: Operations and Management (DSOM '03), pp. 221-233, Oct. 2003.

K. Appleby et al., "Threshold Management for Problem Determination in Transaction Based e-Commerce Systems," IBM Research Report RC23334, The Ninth IFIP/IEEE International Symposium on Integrated Network Management, pp. 733-746, May 2005, France.

* cited by examiner

PERFORMANCE DEGRADATION ROOT CAUSE PREDICTION IN A DISTRIBUTED COMPUTING SYSTEM

CROSS-REFERENCE TO RELATED APPLICATION(S)

This application is a continuation of pending U.S. application Ser. No. 11/435,411 filed on May 17, 2006, the disclosure of which is incorporated herein by reference.

FIELD OF THE INVENTION

The present invention relates generally to distributed information technology, and more particularly relates to performance degradation root cause prediction in a distributed computing environment.

BACKGROUND OF THE INVENTION

One of the major challenges for administrators of distributed information technology environments is maintenance of service level objectives, or SLOs. In accomplishing this goal, it is important that the administrator pinpoint the potential root cause of a system fault as soon as user transaction performance begins to degrade so that corrective action can be taken before an SLO violation occurs, such as the user perceiving major service degradation and/or disruption.

Existing methods for application-level root cause prediction primarily focus on either performance predictions based on historical data or solving queuing network models with the goal of either provisioning the system appropriately or limiting the traffic access in order to satisfy the SLO for incoming traffic. These methods, however, do not take into account system failures which can result in unexpected performance values and thus jeopardize capacity planning estimations and the limits imposed on the arriving traffic.

Existing methods for network failure prediction are typically based on either transmission control protocol (TCP) related data or management information base (MIB) variables, both of which present highly non-stationary characteristics making it difficult to accurately model the dynamics of the system without large amounts of information and processing.

Accordingly, there exists a need for techniques for predicting root cause performance degradation and failure in a distributed computing system while avoiding the complexity and inefficiency found in conventional techniques for predicting network degradation and failure.

SUMMARY OF THE INVENTION

The present invention meets the above-noted need by providing, in an illustrative embodiment thereof, techniques for efficient and effective root cause prediction of performance degradation and failure in a distributed computing system. These techniques offer several advantages over conventional methodologies, including: (i) enabling a system administrator to more quickly locate a potential performance degradation root cause by reducing the number of components to be investigated, and thus the time required for problem determination, so that corrective action can be taken before other users perceive major service degradation; (ii) avoiding inaccuracy in capacity planning and arriving traffic throttling estimations by using the predicted response time to deal with unexpected response times due to imminent failures in the system; and (iii) circumventing problems faced by standard network prediction approaches by using multiple levels of abnormality detection, namely, one level of coarse granularity at the application level, and at least a second level of finer granularity at a resource level. Methodologies of the invention are preferably of low computational complexity and thus well-suited for online implementation.

In accordance with one aspect of the invention, a method of identifying at least one resource in a distributed computing system which is a potential root cause of performance degradation of the system includes the steps of: computing operational bounds for the system and operational bounds for at least one resource in the system; comparing current end-to-end system performance with the operational bounds for the system; when the current end-to-end system performance is outside of the operational bounds for the system, comparing current performance of the at least one resource in the system with the operational bounds for the at least one resource; and generating at least one output identifying the at least one resource in the system which is a potential root cause of performance degradation of the system.

In accordance with another aspect of the invention, apparatus for identifying at least one resource in a distributed system which is a potential root cause of performance degradation of the system includes memory and at least one processor coupled to the memory. The processor is operative to compute operational bounds for the system and operational bounds for at least one resource in the system, and to compare current end-to-end system performance with the operational bounds for the system. When the current end-to-end system performance is outside of the operational bounds for the system, the processor is further operative to compare current performance of the at least one resource in the system with the operational bounds for the at least one resource, and to generate at least one output identifying the at least one resource in the system which is a potential root cause of performance degradation of the system.

These and other objects, features and advantages of the present invention will become apparent from the following detailed description of illustrative embodiments thereof, which is to be read in connection with the accompanying drawings.

DETAILED DESCRIPTION OF THE INVENTION

The present invention will be described in the context of illustrative embodiments of an exemplary data processing system architecture. It should be understood, however, that the invention is not limited to use with any particular system architecture. Rather, the invention is more generally applicable to any distributed computing system in which it is desirable to perform efficient and effective performance degradation root cause prediction.

Figure 1:
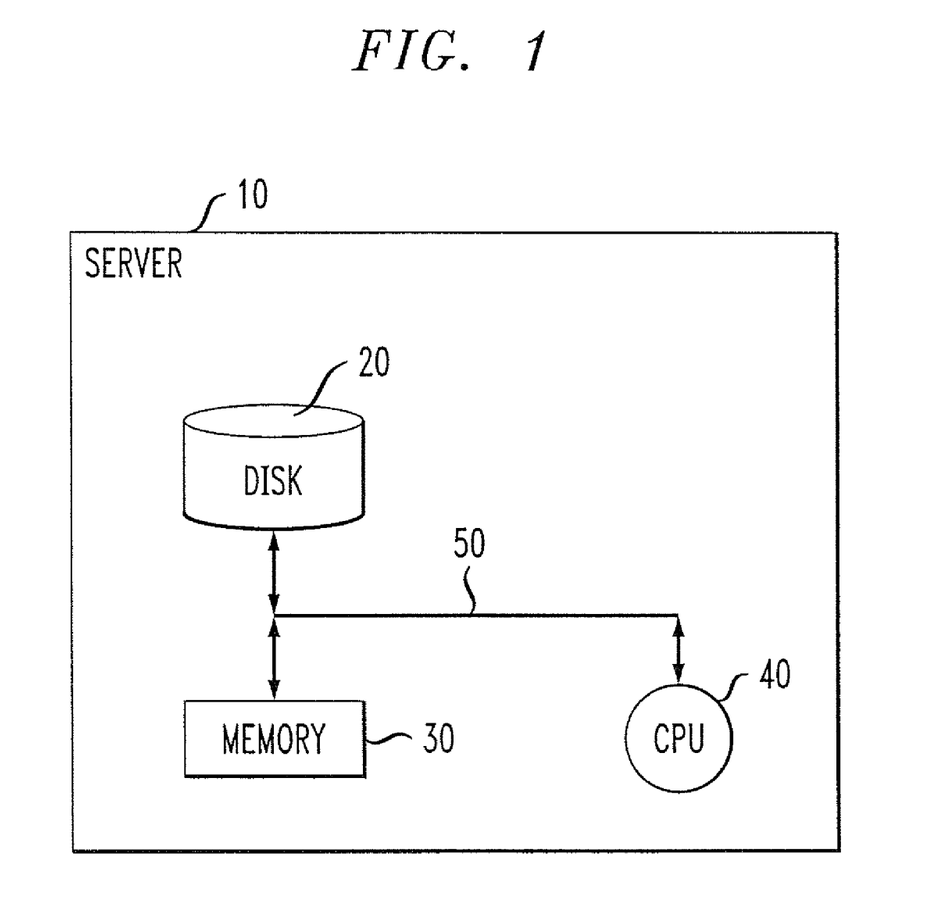
FIG. 1 is a block diagram illustrating an exemplary hardware implementation suitable for employing one or more methodologies for proactive performance degradation root cause prediction, in accordance with an embodiment of the present invention.

FIG. 1 is a block diagram depicting an exemplary hardware implementation suitable for employing one or more proactive performance degradation root cause prediction methodologies, according to an embodiment of the present invention. As shown in the figure, a server 10 preferably includes a disk 20, or alternative data storage means, memory 30 and a central processing unit (CPU) 40, or an alternative processor, operatively coupled together via a bus 50 or other connection arrangement.

It is to be appreciated that the term "processor" as used herein is intended to include any processing device, such as, for example, one that includes a CPU and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor, such as, for example, random access memory (RAM), read only memory (ROM), fixed storage media (e.g., hard drive), removable storage media (e.g., diskette), flash memory, etc.

While the present invention may be described herein in the context of an illustrative data processing system, the methodologies of the present invention may be capable of being distributed in the form of computer readable media, and that the present invention applies equally regardless of the particular type of signal-bearing media actually used to carry out the distribution. The term "computer readable media" as used herein is intended to include recordable-type media, such as, for example, a floppy disk, a hard disk drive, RAM, compact disk (CD) ROM, etc., and transmission-type media, such as digital and analog communication links, wired or wireless communication links using transmission forms, such as, for example, radio frequency and optical transmissions, etc. The computer readable media may take the form of coded formats that are decoded for use in a particular data processing system.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the CPU 40. In any case, it is to be appreciated that at least some of the components of the invention, described herein and shown in the appended figures, may be implemented in various forms of hardware, software, or combinations thereof (e.g., one or more operatively programmed general purpose digital computers with associated memory, implementation-specific integrated circuit(s), functional circuitry, etc.). Given the teachings of the invention provided herein, one of ordinary skill in the art will be able to contemplate other implementations of the components of the invention.

In this illustrative embodiment, disk 20 stores data, which may be received from any source or sources (e.g., one or more client devices connected to the server 10 over a network or other communication link). In one embodiment, this data may include monitored transaction data and polled system information. This data is processed by CPU 40 in order to form a transformed data set, such as, for example, a root cause prioritized data set, using one or more of the methodologies described herein. In addition, memory 30 is preferably used by the CPU 40 (e.g., for data register storage, storing intermediate computation results, etc.) in performing the methodologies of the invention.

Figure 2:
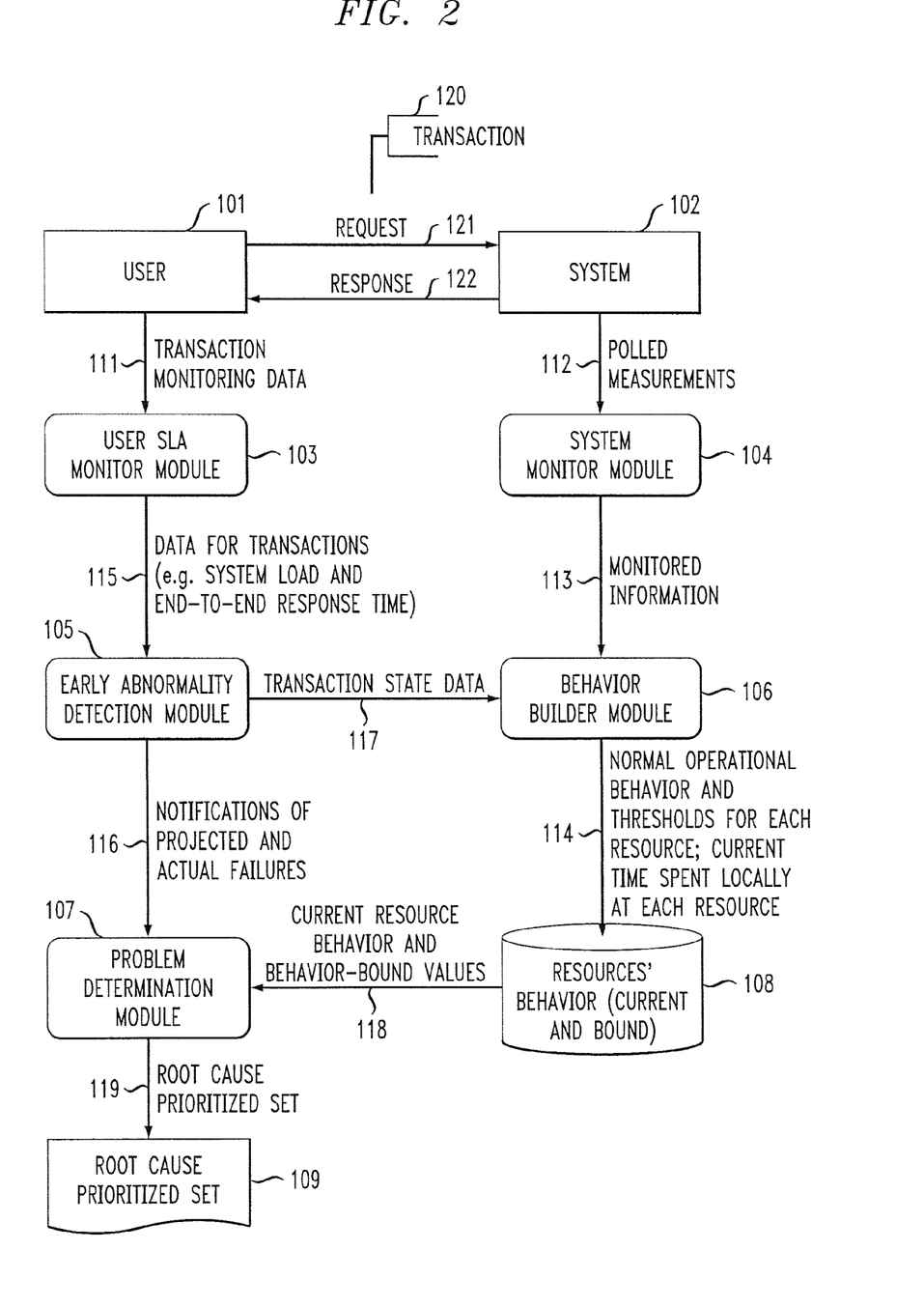
FIG. 2 is a data flowchart illustrating an exemplary methodology for proactive performance degradation root cause prediction, in accordance with an embodiment of the present invention.

Referring now to FIG. 2, a data flow diagram is shown depicting at least a portion of an exemplary proactive problem determination (PD) system, according to an embodiment of the present invention. It is to be understood that the invention is not limited to the particular configuration shown, but rather contemplates other arrangements as may become apparent to those skilled in the art using the teachings herein. Each system component and the flow of information between two or more system components during an operational phase of the PD system are described below.

System 102 in the illustrative PD system represents a distributed transaction processing system which may comprise such resources as, but not limited to, web servers, application servers, database servers, storage equipment, etc. A user 101 interacts with this system 102 by one or more transactions 120 which may comprise requests 121 from the user 101 and/or responses 122 from the system 102. Although not shown, a given transaction 120 may also include requests from the system 102 and/or responses from the user 101.

A service level agreement (SLA) monitoring module 103 is a user-level monitoring system operative to receive the values of metrics 111 related to each of the user transactions 120. The values of the metrics 111 may include, for example, transaction monitoring data. Data 115 relating to system load and/or response time of each transaction instance, among other transaction data, measured by the SLA monitoring module 103 is preferably sent to an early abnormality detection module 105. The early abnormality detection module 105 is operative to receive the transaction data 115 and to perform end-to-end response time abnormality detection based at least in part on the transaction data.

A system monitor module 104 is a system-level monitoring system that is configured to periodically poll each of the resources in the system 102 to obtain the values of metrics which have been defined for the respective resources. The specific metrics that are measured for a given resource and the polling frequency are design parameters that can be selected by a system administrator based, for example, on trial runs, experience, system history, etc. Polled measurement information 112 is delivered, essentially via any standard protocol, from the system 102 to the system monitor module 104. The system monitor module 104 is operative to generate monitored information 113 as a function of the polled measurement information 112.

The PD system further includes a behavior builder module 106, which may be implemented as a set of software modules, standard database, and files that help to compute resource behavior data 114 for each resource in the system 102 based at least in part on the monitored information 113 received from the system monitor module 104. In determining which resources are implicated in a given transaction of type, i, an embodiment of our invention may utilize dependency trees, although alternative resource determination methodologies may also be employed. Dependency trees are described, for example, in an article by M. Gupta et al., entitled "Discovering Dynamic Dependencies in Enterprise Environments for Problem Determination," *Proceedings of* 14*th IFIP/IEEE International Workshop on Distributed Systems: Operations and Management* (*DSOM* '03), October 2003 (hereinafter "Gupta"), which is incorporated by reference herein.

The resource behavior may be defined as the individual contribution of each resource, as a percentage, Pi, to an end-to-end response time of a transaction of type i. This behavior is preferably used to compute dynamic behavior bounds, Ti, for the time locally spent at each resource during a transaction of type i and to detect problems that have already occurred (e.g., using the methodology described, for example, in K. Appleby et al., "Threshold Management in Transaction Based e-Commerce Systems," IBM Research Report RC23334, *Proceedings of 9th IFIP/IEEE International Symposium on Integrated Network Management* (*INM '05*), May 2005 (hereinafter Appleby), which is incorporated by reference herein). However, an embodiment of the present invention may also use this resource behavior data 114 to detect abnormal behavior based on abrupt changes of its mean behavior (e.g., mean response time, etc.) and thus predict failures in the PD system. The behavior bounds Ti corresponding to the transaction of type i are preferably computed only for "successful" transactions using transaction state data 117 generated by the early abnormality detection module 105. The individual contributions (Pi) are computed for both "successful" and "failed" transactions, but as separate values (e.g., $P_S$ and $P_F$). A "successful" transaction may be defined as a transaction that has completed successfully in accordance with certain prescribed criteria (e.g., response time, etc.). Likewise, a "failed" transaction maybe defined as a transaction that has not completed successfully.

Methodologies for building the resource behavior data and for using this data for failure prediction are discussed in further detail herein below. Using these methodologies, the behavior builder module 106 can determine normal operational behaviors, which may be referred to herein as "operational bounds," and thresholds for each resource and transaction, which, together with the current time locally spent at each of the resources, are preferably stored in a database or file 108 preferably indexed by a resource identifier. The database or file 108 stores one or more characteristics 118 (e.g., the behavior bound values and current severity values) for each of the resources in a dependency database or other file format. A problem determination module 107 can then use these values 118 to search for the root cause of the system failure and/or performance degradation.

The early abnormality detection module 105 analyzes end-to-end response times 115 of the transactions received from the user SLA monitor module 103 for abnormality detection. The early abnormality detection module 105 generates, for the problem determination module 107, certain notifications 116, including, but not limited to: (i) predictive alarms, for example, when unexpected values in transaction end-to-end response times are detected; and (ii) SLA violation notifications, for example, when transaction end-to-end response times exceed specified SLA thresholds. SLA thresholds can be defined in terms of a maximum transaction end-to-end response time and/or a maximum load allowed in the system. It is assumed that the distributed system 102 is well provisioned to serve the maximum load allowed in the system in less than the maximum transaction end-to-end response time specified by the SLA, and that the customer load is throttled to keep the input load below the maximum load specified by the SLA. Thus, the alert events for the PD system are assumed to be related to failures in the distributed system 102.

Exemplary steps for detecting response time abnormalities or SLA violations, in accordance with an embodiment of the invention, may comprise the following:

1. Learn the end-to-end response time normal behavior. In order to detect abnormalities in the system, the system is preferably trained in the normal end-to-end response time ($\rho$) as a function of the system load ($\lambda$) during an interval I chosen by the system administrator, based on certain characteristics including, but not limited to, trial runs, experience, history, etc. For example, all user transactions may be exercised in the system a sufficient number of times so as to provide relevant statistics on normal system behavior. In accordance with an illustrative embodiment of the invention, an exemplary method for determining normal system behavior comprises the following steps:

a. During a given interval I, if end-to-end response time for the system is within the bounds specified by the SLA (i.e., if $\rho$<SLA), read the transaction response time $\rho$ and corresponding system load $\lambda$.

b. Compute Pearson's correlation coefficient, r, between $\lambda$ and $\rho$ for each transaction type:

$$r = \frac{\sum \lambda \rho - \frac{\sum \lambda \sum \rho}{N}}{\sqrt{\left(\sum \lambda^2 - \frac{(\sum \lambda)^2}{N}\right)\left(\sum \rho^2 - \frac{(\sum \rho)^2}{N}\right)}},$$

where N is the number of times the transaction occurred in the system during the interval I.

c. Compute the standard deviation, $S_\lambda$ and $S_\rho$, for $\lambda$ and $\rho$, respectively:

$$S_\lambda = \sqrt{\frac{\sum \lambda - M_\lambda}{N}}$$

$$S_\rho = \sqrt{\frac{\sum \rho - M_\rho}{N}},$$

where $M_\lambda$ is the mean system load and $M_\rho$ is the mean response time.

d. Compute the slope b and the 0y intercept A for a linear regression of $\lambda$ and $\rho$:

$$b = r*S_\rho/S_\lambda \text{ and } A = M_\rho - bM_\lambda$$

e. Compute the estimated $\rho$ of the transaction type i as:

$$\rho_i = b\lambda + A$$

2. Detect response time abnormal behavior. Once the system is trained so as to obtain the normal system behavior (e.g., using the methodology described above), the estimated system end-to-end response time of a given transaction type is preferably compared to the real system end-to-end response time 115 received from the user SLA monitor module 103. In accordance with an illustrative embodiment of the invention, an exemplary method for detecting response time abnormal behavior comprises the following steps:

a. If the real end-to-end response time of the given transaction type is larger than the maximum squared difference of the training data and smaller than the maximum end-to-end response time limit specified by the SLA, the early abnormality detection module 105 sends an early alert notification 116 to the problem determination module 107 for failure prediction.

b. If the real end-to-end response time of the given transaction type is larger than the maximum limit specified by the SLA, the early abnormality detection module 105 sends an SLA violation notification 116 to the problem determination module 107 for failure detection.

When the early abnormality detection module 105 detects response time abnormalities for a given transaction type, the transaction type is considered to be in "failed" state; otherwise the transaction type is considered to be in a "successful" state. The transaction state data 117 for each transaction is preferably updated periodically (e.g., continuously or otherwise) at the behavior builder module 106.

When the problem determination module 107 receives an alert notification 116 from the early abnormality detection module 105 for a given transaction, the problem determination module is operative to retrieve information 118 regarding the current behavior of the resources found to be failed or anticipated to fail and their corresponding behavior bound values (Ti). In accordance with an embodiment of the invention, an exemplary methodology for detecting the root cause of system failure and/or performance degradation comprises the following steps:

1. Computing a severity value for each resource associated with the given transaction of type i as a ratio of the current behavior (i.e., the time locally spent currently at each resource) and the bound Ti; and 2. Sorting resources associated with the given transaction type using the computed severity values. The resources with the highest severity values, which are indicative of resources having response times most closely exceeding a prescribed normal response time threshold for those respective resources, are the most likely potential root causes of the predicted or detected failure.

The problem determination module 107 is preferably operative to generate a root cause prioritized set 119, which may be stored as a data structure 109 or an alternative output for further use by the system administrator.

Figure 3:
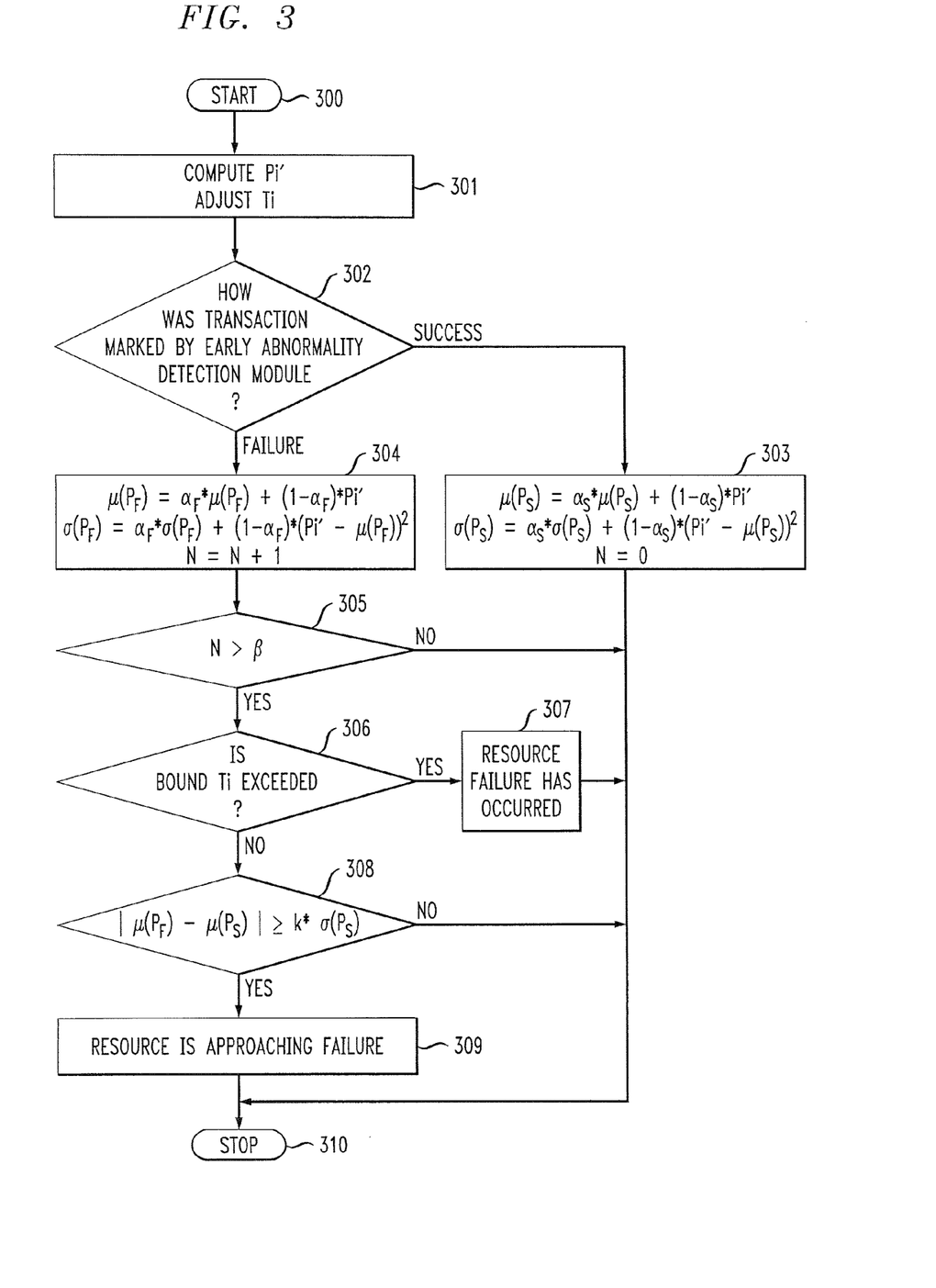
FIG. 3 is a data flowchart illustrating an exemplary methodology for computing normal operational bounds for at least one transaction and at least one resource, wherein isolated SLO violations are disregarded, in accordance with an embodiment of the present invention.

Referring now to FIG. 3, a data flow diagram illustrates an exemplary methodology which can be used to implement at least a portion of the functionalities of behavior builder module 106, according to an embodiment of the present invention. The methodology starts at block 300 whenever data is received regarding a transaction. In step 301, the module computes Pi', a new individual contribution of each resource to the system end-to-end response time based on the current transaction of type i, and adjusts Ti (e.g., using methodologies as described in Appleby). If the transaction was marked as being "successful" by the early abnormality detection module (105 in FIG. 2), step 303 preferably updates a running average of Pi for successful transactions $\mu(P_S)=\alpha_S*\mu(P_S)+(1-\alpha_S)*Pi'$ and a running variance of Pi for successful transactions $\sigma(P_S)=\alpha_S*\sigma(P_S)+(1-\alpha_S)*(Pi'-\mu(P_S))^2$, where $\alpha_S$ is a tuning parameter which reflects a relative weight given to each new data point. Step 303 also resets N to zero, where N is a counter which keeps track of the number of consecutive failed transactions. The module then terminates the process by proceeding to step 310.

If, on the other hand the transaction is marked as "failed" by the early abnormality detection module 105, process flow proceeds to step 304 which updates a running average of Pi for failed transactions $\mu(P_F)=\alpha_F*\mu(P_F)+(1-\alpha_F)*Pi'$ and a running variance of Pi for failed transactions $\sigma(P_F)=\alpha_F*\sigma(P_F)+(1-\alpha_F)*(Pi'-\mu(P_F))^2$. Additionally, the counter N which keeps track of the number of consecutive failed transactions is incremented, preferably by one (e.g., N=N+1). Alternatively, the counter may be preloaded with a known value and then decremented for each occurrence of a failed transaction, as will become apparent to those skilled in the art.

Next, process flow continues to step 305, where the counter is checked to determine whether or not a certain threshold value, $\beta$, has been exceeded (e.g., N>$\beta$). In an embodiment of the invention, $\beta$ is a tuning parameter representing a number of consecutive failed transactions (e.g., 5). The invention, however, is not limited to any particular number for $\beta$. If the counter N is less than $\beta$, indicating that there have been less than $\beta$ consecutive failed transactions, the methodology may be configured to ignore the current failed transaction as being a sporadic failure, thereby providing some selectable degree of filtering. The process then terminates by advancing to step 310.

When the counter N exceeds the prescribed threshold value P (e.g., N>$\beta$), the process flow continues to step 306 to determine whether or not the operational bounds for the resource, Ti, have been exceeded. If so, then resource failure has already occurred and the module terminates further processing by advancing to step 310. If the operational bounds for the resource, Ti, have not been exceeded, process flow continues to step 308 which tests for significant changes between Pi for successful and unsuccessful transactions by using, for example, a Shewhart control chart, or an alternative methodology for determining variation between predictable limits. A change may be deemed "significant," for example, when it is determined that the resource is approaching failure (step 309). When the quantity $|\mu(P_F)-\mu(P_S)| \geq k \exists \sigma(P_S)/\sqrt{N}$, where k is another tuning parameter (e.g., 3), the change is preferably considered to be significant, indicating that the resource is approaching failure. In either case, processing ends at step 310.

Figure 4:
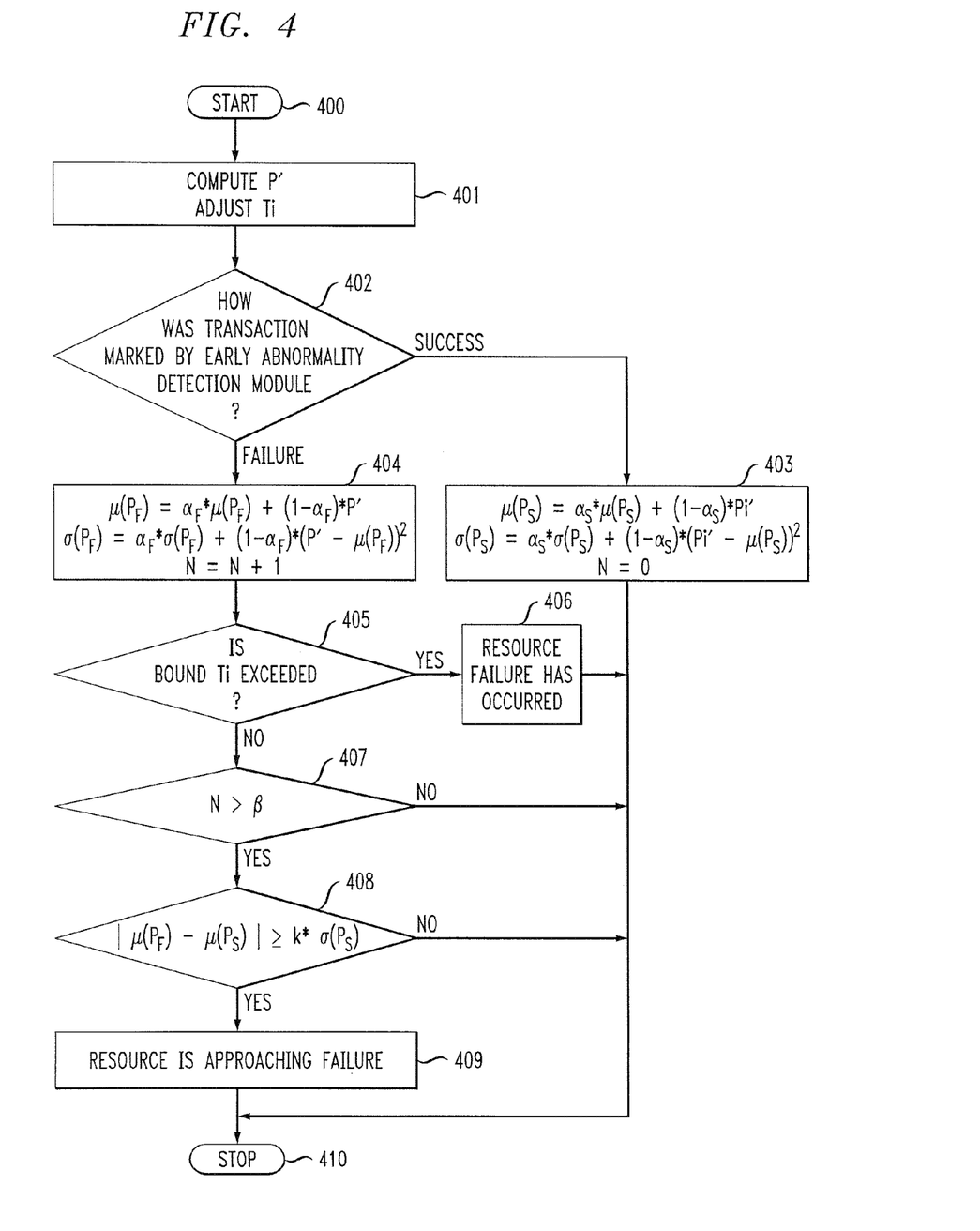
FIG. 4 is a data flowchart illustrating an exemplary methodology for computing normal operational bounds for at least one transaction and at least one resource, wherein isolated SLO violations are regarded as being indicative of resource failure, in accordance with an embodiment of the present invention.

FIG. 4 depicts a data flow diagram illustrating another exemplary methodology which can be used to implement the behavior builder module 106, according to an embodiment of the present invention. Steps 400-404 and 408-410 may be performed in a manner similar to steps 300-304 and 308-310, respectively, shown in FIG. 3 and described above. However, in the methodology depicted in FIG. 4, when processing a failed transaction, step 405 preferably checks to see whether or not bound Ti has been exceeded and, if so, process flow continues to step 406 which determines that a resource failure has occurred before checking to see whether or not the counter N has exceeded the prescribed threshold P (e.g., N>$\beta$) in step 407. In this manner, the methodology shown in FIG. 4 will essentially only ignore sporadic failures which do not result in the operational bounds being exceeded but will trigger a notification whenever operational bounds for a given transaction are exceeded. This may be useful, for example, in applications where there is a SLO sufficiently strict such that even a single failed transaction requires immediate operator intervention.

Illustrative embodiments of the present invention described herein provide a privacy-preserving data mining approach that improves upon previous techniques for predicting root cause performance degradation and failure in a distributed computing system.

By way of example only and without limitation, consider an embodiment of the invention implemented in conjunction with a transaction processing system. If a given transaction manifests an unacceptably slow end-to-end response time compared to a computed expected performance, the proactive PD system will first scan a dependency tree (see, e.g., Gupta) of the transaction in order to determine the set of resources involved in the transaction and that may be the likely root cause of the observed performance degradation. Next, the system will compare the current behavior variations of each of these resources to the expected behavior variation previously computed by the invention using, for example, techniques described in Appleby. Those resources for which abnormal behavior changes have been detected will be marked as potential root cause resources. If there is only one resource then that resource is most likely the root cause. If the set of potential root cause resources contains more than one resource, then the resources in the set are ordered based on a sorting methodology to create an ordered set, so that the system administrator, or another computer program, etc., can probe the components individually in a prioritized sequence to identify the root cause and take measures to avert the system failure.

In other words, in the illustrative embodiment of the invention, the PD system first automatically compares the system observed performance to the expected end-to-end performance computed by methodologies of the invention and triggers predictive alarms in order to detect, in advance of service disruption, end-to end application performance anomalies in a typical distributed computing system. Next, the PD system computes operational bounds for normal behavior variations in the resources during normal operation and automatically compares the current behavior variations to these bounds upon alarm notification receipt to detect potential root causes for the anticipated failures. Finally, the PD system orders the suspected root cause components of the system using the operational bounds, so that a system administrator or a problem determination program can investigate each component further in a priority sequence and find the root cause in the ordered list as early as possible.

The techniques of the present invention offer several advantages over previous methodologies, including the following: (i) by reducing the number of components to be investigated and thus the time required for problem determination, the techniques of the invention enable the system administrator to proactively locate the potential performance degradation root cause so that corrective action can be taken before other users perceive major service degradation, such as, for example, an SLO violation; (ii) by using the predicted response time to deal with unexpected response times due to imminent failures in the system, methodologies of the invention offer additional information to avoid inaccuracy in capacity planning and arriving traffic throttling estimations; (iii) embodiments of the invention circumvent problems faced by standard network prediction approaches by using multiple levels of abnormality detection, namely, one level of coarse granularity at the application level, and at least a second level of finer granularity at a resource level. Methodologies of the invention are preferably linear regression and change detection on metrics with stationary characteristics which are of low computational complexity and thus well-suited for online implementation.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of identifying at least one resource in a distributed computing system which is a potential root cause of performance degradation of the system, the method comprising the steps of:

computing operational bounds for the system with regard to a given transaction of a given transaction type;

computing operational bounds for each resource in the system associated with the given transaction of the given transaction type, wherein computing operational bounds for each resource comprises computing an individual contribution of each resource to an end-to-end response time for the given transaction, wherein the individual contribution of a given resource comprises a first parameter corresponding to an individual contribution of the given resource with regard to successful transactions of the given transaction type, and a second parameter corresponding to an individual contribution of the given resource with regard to failed transactions of the given transaction type;

comparing current end-to-end system performance for the given transaction with the operational bounds for the system for the given transaction; and when the current end-to-end system performance is outside of the operational bounds for the system, then:

comparing a current performance of each resource in the system associated with the given transaction with the operational bounds for each resource associated with the given transaction;

computing a severity value for each resource associated with the given transaction, wherein the severity value of a given resource is based on a ratio of the current performance of the given resource and the computed operational bounds for the given resource in the system; and generating at least one output identifying at least one resource in the system which is a potential root cause of performance degradation of the system, wherein the output comprises a sorted set of the resources associated with the given transaction sorted in an order of the computed severity values, and when the current end-to-end system performance is not outside of the operational bounds for the system and when the given transaction is deemed a failed transaction, then determining if a given resource is approaching a failure based on the first and second parameters corresponding to the individual contributions of the given resource with regard to successful and unsuccessful transactions for the given transaction type.

2. The method of claim 1, wherein at least one of the operational bounds for the system and the operational bounds for the at least one resource are calculated based on load-adjusted response time.

3. The method of claim 1, wherein the step of computing an individual contribution of of a given resource to an end-to-end response time for the given transaction comprises using a dependency tree to determine which resources to inspect for the given transaction.

4. The method of claim 1, wherein the output is an ordered set of the at least one resource which is a potential root cause of performance degradation in the system.

5. Apparatus for identifying at least one resource in a distributed computing system which is a potential root cause of performance degradation of the system, the apparatus comprising:

a memory; and at least one processor coupled to the memory and operative:

to compute operational bounds for the system with regard to a given transaction of a given transaction type;

to compute operational bounds for each resource in the system associated with the given transaction of the given transaction type, wherein computing operational bounds for each resource comprises computing an individual contribution of each resource to an end-to-end response time for the given transaction, wherein the individual contribution of a given resource comprises a first parameter corresponding to an individual contribution of the given resource with regard to successful transactions of the given transaction type, and a second parameter corresponding to an individual contribution of the given resource with regard to failed transactions of the given transaction type;

to compare current end-to-end system performance for the given transaction with the operational bounds for the system for the given transaction; and when the current end-to-end system performance is outside of the operational bounds for the system, then:

to compare a current performance of each resource in the system associated with the given transaction with the operational bounds for each resource associated with the given transaction;

to compute a severity value for each resource associated with the given transaction, wherein the severity value of a given resource is based on a ratio of the current performance of the given resource and the computed operational bounds for the given resource in the system; and to generate at least one output identifying at least one resource in the system which is a potential root cause of performance degradation of the system, wherein the output comprises a sorted set of the resources associated with the given transaction sorted in an order of the computed severity values, and when the current end-to-end system performance is not outside of the operational bounds for the system and when the given transaction is deemed a failed transaction, then to determine if a given resource is approaching a failure based on the first and second parameters corresponding to the individual contributions of the given resource with regard to successful and unsuccessful transactions for the given transaction type.

6. The apparatus of claim 5, wherein at least one of the operational bounds for the system and the operational bounds for the at least one resource are calculated based on load-adjusted response time.

7. The apparatus of claim 5, wherein the step of computing an individual contribution of a given resource to an end-to-end response time for the given transaction comprises using a dependency tree to determine which resources to inspect for the given transaction.

8. The apparatus of claim 5, wherein the output is sorted based at least in part on a comparison of the current performance of the at least one resource with the operational bounds of the at least one resource.

9. An article of manufacture for identifying at least one resource in a distributed system which is a potential root cause of performance degradation of the system, comprising a machine readable storage medium containing one or more programs which when executed implement the steps of:

computing operational bounds for the system with regard to a given transaction of a given transaction type;

computing operational bounds for each resource in the system associated with the given transaction of the given transaction type, wherein computing operational bounds for each resource comprises computing an individual contribution of each resource to an end-to-end response time for the given transaction, wherein the individual contribution of a given resource comprises a first parameter corresponding to an individual contribution of the given resource with regard to successful transactions of the given transaction type, and a second parameter corresponding to an individual contribution of the given resource with regard to failed transactions of the given transaction type;

comparing current end-to-end system performance for the given transaction with the operational bounds for the system for the given transaction; and when the current end-to-end system performance is outside of the operational bounds for the system, then:

comparing a current performance of each resource in the system associated with the given transaction with the operational bounds for each resource associated with the given transaction;

computing a severity value for each resource associated with the given transaction, wherein the severity value of a given resource is based on a ratio of the current performance of the given resource and the computed operational bounds for the given resource in the system; and generating at least one output identifying at least one resource in the system which is a potential root cause of performance degradation of the system, wherein the output comprises a sorted set of the resources associated with the given transaction sorted in an order of the computed severity values, and when the current end-to-end system performance is not outside of the operational bounds for the system and when the given transaction is deemed a failed transaction, then determining if a given resource is approaching a failure based on the first and second parameters corresponding to the individual contributions of the given resource with regard to successful and unsuccessful transactions for the given transaction type.

10. The method of claim 1, wherein the step of determining if a given resource is approaching a failure is performed when the current end-to-end system performance is not outside of the operational bounds for the system and when the given transaction is deemed a failed transaction and further when the number of consecutive failed transactions for the given transaction type has exceeded a predefined threshold.

11. The apparatus of claim 5, wherein the processor determines if a given resource is approaching a failure is performed when the current end-to-end system performance is not outside of the operational bounds for the system and when the given transaction is deemed a failed transaction and further when the number of consecutive failed transactions for the given transaction type has exceeded a predefined threshold.

12. The article of manufacture of claim 9, wherein the step of determining if a given resource is approaching a failure is performed when the current end-to-end system performance is not outside of the operational bounds for the system and when the given transaction is deemed a failed transaction and further when the number of consecutive failed transactions for the given transaction type has exceeded a predefined threshold.

* * * * *